J. K. LIBBY.
VEHICLE WHEEL.
APPLICATION FILED DEC. 15, 1910.
1,035,207.
Patented Aug. 13, 1912.
2 SHEETS—SHEET 2.
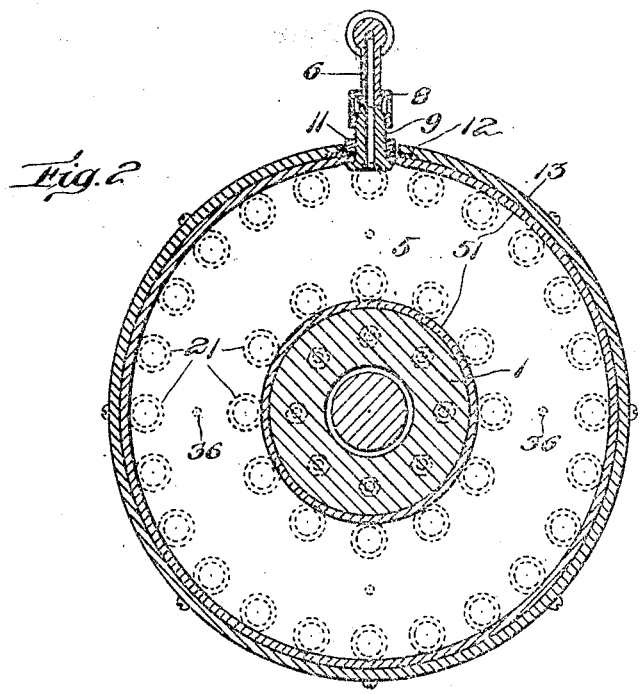
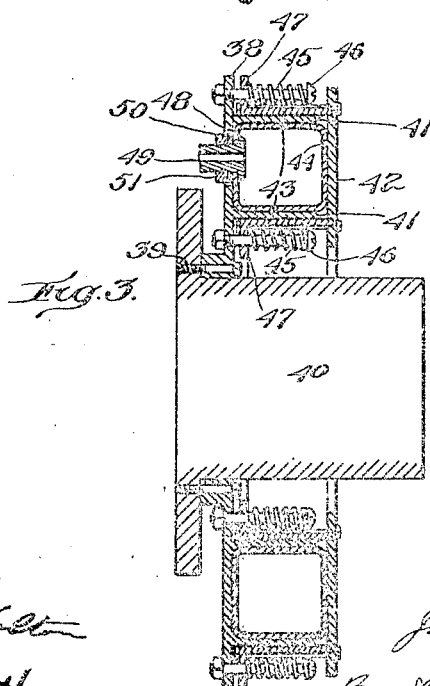

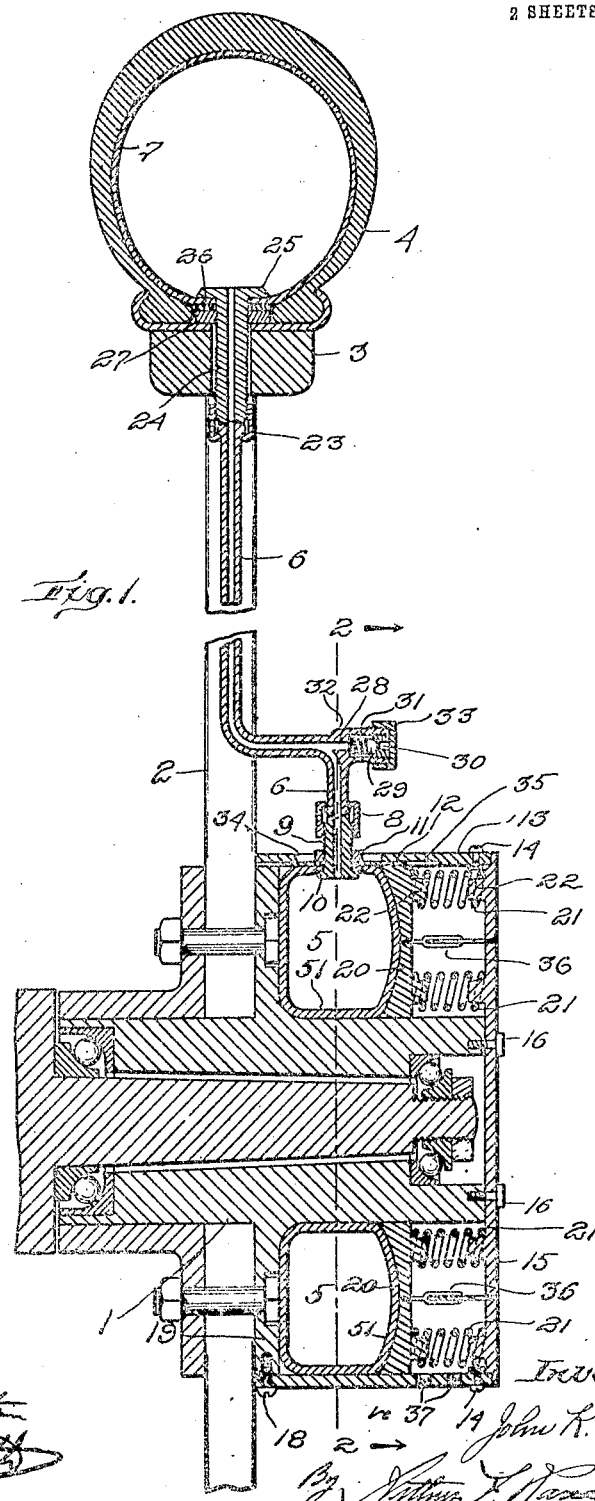

UNITED STATES PATENT OFFICE.

JOHN K. LIBBY, OF MALDEN, MASSACHUSETTS.

VEHICLE-WHEEL.

1,035,207. Specification of Letters Patent. Patented Aug. 13, 1912.

Application filed December 15, 1910. Serial No. 597,416.

To all whom it may concern:

Be it known that I, JOHN K. LIBBY, a citizen of the United States of America, residing at Malden, in the county of Middlesex and State of Massachusetts, have invented certain new and useful Improvements in Vehicle-Wheels, of which the following is a specification.

My invention relates to improvements in vehicle wheels and particularly to improvements in wheels which have pneumatic tires.

One of the objectionable features of pneumatic tired automobile wheels as heretofore constructed has been that they would frequently burst or blow out on account of excess pressure within the tire caused by the expansion of the air confined therein resulting from friction or changes in temperature, or by sudden contact of the tire with obstacles in the road. That is, although the tires would be inflated to the proper degree at the time of filling and the air contained therein would be under a normal safe working pressure, yet frequently while in use, either through changes in temperature or otherwise, the air within the tube would expand to such an extent that it would burst the tire, particularly when the tire was subjected to the sudden strains and shocks such as occur in ordinary use, and especially with heavy vehicles. This bursting of the tire was a comparatively frequent occurrence and was not only a source of great expense and trouble in repairing the damaged tire, or replacing it by a new one, but it has also been the cause of many serious and fatal accidents.

Another disadvantage was that the constant variations in the pressure of the confined air of the tire brought injurious strains upon the latter which greatly shortened its life.

The object of my invention is to improve the construction of vehicle wheels of the class indicated so as to prevent the bursting of the tire through the causes mentioned and to lengthen the life of the tire by preventing the expansion of the air confined therein from exerting injurious strains upon the tire.

To these ends my invention, in its best form, consists of a vehicle wheel having a penumatic tire whose interior communicates with an elastic relief chamber so that when the pressure of the air in the tire increases said air is exhausted into the relief chamber thereby preventing an excessive or injurious pressure from existing in the tire, and also so that when the pressure of the air in the tire falls air will be exhausted from the relief chamber into the tire thereby preventing an excessive fall in pressure of the air in the tire.

It will thus be seen that a distinguishing feature of my invention is the provision of means for automatically compensating for the variations in the temperature of the air within the tire so as to maintain said air under a normal safe working pressure whatever causes said variations. By this means I not only prevent the bursting of the tire through the expansion of the air contained therein, but I also prevent the tire being subjected to injurious internal pressures that would otherwise be caused by the shocks and blows the tire receives in ordinary use.

In the accompanying drawings:—Figure 1 is a sectional view of a portion of a vehicle wheel embodying one form of my invention. Fig. 2 is a section on line 2—2 of Fig. 1. Fig. 3 shows another form of my invention.

Having reference to Figs. 1 and 2 of the drawings, 1 represents the hub of a wheel, 2 the spokes, 3 the felly, 4 the tire and 5 the elastic relief chamber whose interior is connected by a pipe 6 with the inner tube 7 of tire 4. At its inner end pipe 6 is connected by a union 8 with one end of a nipple 9 that extends through the outer wall of an annular elastic tube-like lining 51 provided within the chamber 5, the nipple 9 being provided at its inner end with a flange or head 10 between which and a shoe 12 the wall of lining 51 is tightly clamped by a nut 11. The elastic lining 51 may be a hollow ring or tube of rubber surrounding the hub 1, said tube being inclosed by a casing comprising a sleeve 13 fastened by screws 14 to an end wall or plate 15. This end wall 15 is fastened by screws 16 to the end of hub 1 while the sleeve 13 is fastened by screws 18 to a flange 19 on hub 1. The flange 19 serves as a fixed abutment for one side of lining 51 while a plunger 20 movably mounted upon hub 1 within casing 13—15 is yieldingly held against the opposite side of lining 51 by a plurality of springs 21 that are held in position by lugs or bosses 22 provided on end wall 15 and plunger 20. At its outer end the pipe 6 is connected by a union 23 with one end of a nipple 24 which extends through felly 3 and the wall of tube 7. The end of nipple 24 within tube 7 is provided with a flange or head 25 between which and a washer 26 the wall of tube 7 is firmly clamped by a nut 27 screwed onto nipple 24.

The pipe 6 is made with a port 28 normally closed by a ball valve 29 that is yieldingly held on its seat 30 by a spring 31. The port 28 is the interior of a branch pipe 32 which at its outer end is exteriorly threaded to receive upon it an interiorly threaded removable cap 33. When the cap 33 is removed an air pump may be attached to the threaded end of branch 32 to fill tube 7, pipe 6 and chamber 5 with air under pressure, or the valve 29 may be manipulated to release the air from said parts.

At the point where the nipple 9 extends through sleeve 13 the latter is made with an elongated slot 34 which is covered upon the inside of said sleeve by the shoe 12, said shoe being made longer and wider than slot 34 so that it may move to a considerable extent lengthwise of the slot without uncovering the latter. The shoe 12 is slidably mounted in a groove 35 formed upon the interior of sleeve 13 so that the inner face of the shoe is flush with the surface of the interior of sleeve 13. The purpose of this shoe is to serve as a guard or shield which prevents rubbing contact between the edges of slot 34 and the adjacent wall of the rubber lining 51.

For convenience in handling and in assembling or disassembling the parts, the plunger 20 is connected by elongated links or eyes 36 with the wall 15, said links or eyes being made sufficiently long to permit plunger 20 to move freely back and forth within sleeve 13 as the elastic chamber 5 expands and contracts, but adapted when wall 15 is separated or removed from the other parts, to hold plunger 20 in position against the ends of springs 21.

When the tire 4 is properly inflated the plunger 20 will occupy an intermediate position as shown in Fig. 1, and if the temperature of the air confined in tire 4 is raised from any cause the expanding air will force its way into pipe 6 and chamber 5. This expands the chamber 5 and forces the plunger 20 outwardly in opposition to the pressure of springs 21, the air pressure in chamber 5 and tire 4 increasing slightly but only in proportion to the compression of springs 21. The increase in the pressure of the springs 21 due to compression is, however, definite and limited and while there will be some increase in the pressure of the air in tire 4 as its temperature rises and it expands, the greatest possible rise in temperature under ordinary circumstances will not be sufficient to injuriously strain the tire or cause it to burst. Moreover, when the temperature of the air in tire 4 is normal or otherwise any sudden strains or shocks are cushioned and relieved by the springs 21 so that bursting of tire 4 from this cause is also prevented. When the temperature of the air in tire 4 falls and the air contracts the springs 21 will force plunger 20 inwardly thus contracting chamber 5 and forcing air therefrom through pipe 6 into tire 4. It will thus be seen that the chamber 5 with its springs 21 not only serves as means for preventing excess pressure in tire 4 but also as means for supplying air under pressure to said tire whenever the air pressure in the latter falls. In other words, the chamber 5 with its springs 21 not only automatically compensates for the expansion and contraction of the air in tire 4 so as to maintain said tire full of air under a normal safe and effective or serviceable pressure, but it also serves to relieve the tire of the shock of sudden blows or strains.

In order to prevent undue wear of the rubber lining 51 as it is expanded and contracted the plunger 20 is made to closely fit the exterior of hub 1 and the interior of sleeve 13 so that no cracks or crevices are presented to said lining at these points. Owing to the tight fit of plunger 20 vents 37 are provided through the wall of sleeve 13 through which air can pass into and out of the space behind plunger 20 as the latter moves back and forth.

The pipe 6 is sufficiently flexible to permit the inner end thereof to move back and forth as the chamber 5 expands and contracts, while the shoe 12 is free to slide lengthwise of the slot 35 as said end is shifted.

In Fig. 3 I have shown a modification in which the elastic relief chamber is in the form of an attachment adapted to be fitted to the hub of an ordinary wheel. In this form of my invention the relief chamber comprises a ring 38 adapted to be fastened by screws 39 to the hub 40 of an ordinary wheel. This ring 38 is made with two annular and laterally projecting flanges 41 which telescope with two annular flanges 43 provided on a second ring 42, and, together with the said flanges 43, inclose an elastic lining consisting of an annular hollow rubber tube or ring 44. The two rings 38 and 42 are yieldingly pressed toward each other by a plurality of springs 45 interposed between the heads of bolts 46 projecting from ring 38 and annular lips 47 on the flanges 43. The ring 38 is made with an aperture 48 through which extends a nipple 49, said nipple passing through the wall of lining 44 and being provided upon its inner end with a head between which and a washer 50 said wall is firmly clamped by a nut 511. This nipple 49 is connected with the tire of the wheel in the same fashion as nipple 9 of Figs. 1 and 2. This form of my invention has the advantage that it can be applied to ordinary wheels and by making the middle opening of the ring 38 of a size to fit, or smaller than, the smallest hub, said opening may be turned out and thereby enlarged to fit any other size.

From the above description it will be seen that in Figs. 1 and 2 sleeve 13, wall 15 and hub 1 constitute one section of the elastic chamber 5 and the plunger 20 the other section, while in Fig. 3 the ring 38 is one section of the chamber and the ring 42 the other section.

What I claim is:

1. A vehicle wheel comprising a pneumatic tire; an annular relief chamber on said wheel and surrounding the hub thereof, said chamber comprising two annular relatively movable sections having an annular air chamber between them; means for yieldingly holding said sections against expanding movement, and a pipe connecting the interior of the relief chamber with the interior of the tire.

2. A vehicle wheel comprising a pneumatic tire; an annular relief chamber on said wheel and surrounding the hub thereof, said chamber comprising two annular sections having an annular air chamber between them, one of said sections being stationary and the other sliding telescopically within the stationary section; means for yieldingly holding the movable section against expanding movement; an annular elastic tube-like lining for the relief chamber, and a pipe connecting the interior of the relief chamber with the interior of the tire.

3. A vehicle wheel comprising a pneumatic tire; an annular relief chamber on said wheel and surrounding the hub thereof, said chamber being made up of two annular relatively movable sections having an annular air chamber between them and means for yieldingly holding said sections against expanding movement; an annular elastic tube-like lining for the relief chamber, and a pipe connecting the interior of the elastic lining with the interior of the tire.

In testimony whereof I have affixed my signature, in presence of two witnesses.

JOHN K. LIBBY.

Witnesses:
    George H. McAllister,
    Mary E. Shea.